United States Patent [19]

Gharapetian et al.

[11] Patent Number: 5,229,209

[45] Date of Patent: Jul. 20, 1993

[54] PREPARATION OF VESICULATED CORE/SHELL POLYMERIC PARTICLES

[75] Inventors: Hrire Gharapetian, Concord; Gerald K. Chip, Scarborough; Alfred Rudin, Waterloo, all of Canada

[73] Assignee: Tioxide Group PLC, London, England

[21] Appl. No.: 672,932

[22] Filed: Mar. 21, 1991

[30] Foreign Application Priority Data

Mar. 30, 1990 [GB] United Kingdom ............... 9007199

[51] Int. Cl.$^5$ .................................. B32B 5/16
[52] U.S. Cl. .................................. 428/403; 428/407; 428/515; 428/523; 521/57; 521/60; 521/62; 521/63; 525/201; 525/902
[58] Field of Search ............... 428/515, 523, 402.2, 428/402.21, 402.22, 407, 403; 521/57, 60, 62, 63; 525/201, 902

[56] References Cited

U.S. PATENT DOCUMENTS

| | | | |
|---|---|---|---|
| 3,359,130 | 12/1967 | Goldman | 428/407 |
| 3,379,799 | 4/1968 | Goldman | 521/56 X |
| 3,431,319 | 3/1969 | Baum | 428/319.3 |
| 4,044,176 | 8/1977 | Wolinski et al. | 428/159 X |
| 4,107,120 | 8/1978 | Plamondon et al. | 260/29.6 RB |
| 4,181,769 | 1/1980 | Plamondon et al. | 428/253 |
| 4,226,752 | 10/1980 | Erikson et al. | 260/29.6 RB |
| 4,325,856 | 4/1982 | Ishikawa et al. | 523/201 |
| 4,419,496 | 12/1983 | Henton et al. | 525/301 |
| 4,427,836 | 1/1984 | Kowalski et al. | 525/301 |
| 4,468,498 | 8/1984 | Kowalski et al. | 525/301 |
| 4,469,825 | 9/1984 | Kowalski et al. | 523/201 |
| 4,497,917 | 2/1985 | Upson et al. | 523/201 |
| 4,521,568 | 6/1985 | Mori et al. | 525/309 |
| 4,543,383 | 9/1985 | Heil et al. | 524/458 |
| 4,594,363 | 6/1986 | Blankenship et al. | 521/64 |
| 4,677,003 | 6/1987 | Redlich et al. | 427/373 |
| 4,717,750 | 1/1988 | Makati et al. | 524/458 |
| 4,863,973 | 9/1989 | Chip et al. | 521/64 |
| 4,916,171 | 4/1990 | Brown et al. | 523/161 |
| 4,920,160 | 4/1990 | Chip et al. | 523/201 |
| 4,985,469 | 1/1991 | Chip et al. | 521/64 |
| 5,026,782 | 6/1991 | Biale | 525/317 |
| 5,053,441 | 10/1991 | Biale | 523/201 |

FOREIGN PATENT DOCUMENTS 0073529 6/1980 European Pat. Off. .
0031964 7/1981 European Pat. Off. .
0188325 1/1986 European Pat. Off. .

*Primary Examiner*—Paul J. Thibodeau
*Assistant Examiner*—Hoa T. Le
*Attorney, Agent, or Firm*—Baker & Botts

[57] ABSTRACT

A process for the manufacture of core/shell polymer particles comprises forming a core particle containing acid functionality, a first shell around said core of a copolymer of a nonionic monoethylenically unsaturated aromatic monomer and a copolymerisable polar monomer in an amount of at least 15% by weight of the copolymer and having a solubility in water at 20° C. of at least 1% by weight and a second shell around said first shell of a polymer or copolymer of a nonionic monomer having a solubility in water at 20° C. of less than 1% by weight and swelling the particle with a non-volatile alkali to generate one or more vesicles.

Preferably each shell contains a polymer or copolymer of styrene.

13 Claims, No Drawings

PREPARATION OF VESICULATED CORE/SHELL POLYMERIC PARTICLES

This invention relates to the preparation of polymeric particles and particularly to vesiculated core/shell polymer particles.

Hitherto polymer particles containing a void or voids have been known for use as opacifying agents in coating compositions and other products. Such opacifiers can be made by a process involving sequential emulsion polymerization of particles comprising an ionic core containing acid groups and a sheath polymer around the core. Such core/shell polymer can be swollen in hot aqueous basic solutions to produce particles that contain voids which are filled with water when the particles are still in the form of an aqueous dispersion. On drying the voids should become filled with air, thus enhancing the opacifying properties of the particles. While useful, such products have some disadvantages that are overcome by the products of this invention. Particularly a reduced opacity from that most desired was believed to be associated with less than ideal encapsulation of the core by the sheath which tended to result in rupturing of the shell when the particle was subsequently swollen to produce a vesicle or vesicles. By this invention we have devised a method for ensuring that the core of said unswollen core/shell particles is adequately centered within the sheath so that undesired rupture of particles during the swelling step is significantly reduced.

Another disadvantage of the products of the type described above is a tendency for coatings based on polymer emulsions and containing such particles as opacifying agents to have inadequate gloss. This invention discloses procedures to produce substantially unruptured, swollen void-containing particles, the use of which does not affect the gloss of water-based coatings adversely.

Clearly there is a need for a core/shell polymer particle of improved core centering and gloss when used in a paint.

According to the invention a process for the manufacture of vesiculated core/shell particles comprises:
forming an aqueous emulsion of at least one ethylenically unsaturated monomer with acid functionality, polymerising said unsaturated monomer to form core particles of polymer
forming an aqueous dispersion of said core particles and a monomer mixture of a nonionic monoethylenically unsaturated aromatic monomer and a copolymerisable polar monomer in an amount of at least 15 per cent by weight of the total weight of the monomer mixture and said copolymerisable polar monomer having a solubility in water at 20° C. of at least 1 per cent by weight
polymerising said monomer mixture to form a first shell on said core particles
adding to an aqueous dispersion of said core particles having a first shell a further nonionic monomer which has a solubility in water at 20° C. of less than 1 per cent by weight and polymerising said further monomer to form a second shell on the said particles, and
mixing the core/shell particles so obtained with a nonvolatile fixed or permanent base to swell the cores and generate therein one or more vesicles.

The products of the process of this invention have fewer ruptured particles and hence are better opacifiers than those made according to the same process in which the first, intermediate shell layer has been omitted. When used as opacifiers in latex paints the resulting dried compositions have better gloss than products made according to the same process in which the second, outer shell layer has been omitted.

The production of the core particles is usually accomplished by sequential emulsion polymerization in aqueous media. In the most preferred embodiment of this invention particles of a preformed latex or "seed" polymer dispersed in water are increased in size by polymerization of the required monomers to form one or more successive polymers onto these preformed particles. Care must be taken in these subsequent polymerization stages to ensure that the later stage polymers are deposited on these preformed particles and do not form new particles or are not embedded within these polymer particles that have been made in the previous stage. The procedures of this invention are effective in preventing the formation of "new generation" particles wherein a second or later polymerization stage results in a product which is not deposited on the preformed particles. Measurement of the particle size distributions of the dispersed polymer at every stage of the sequential polymerization process ensures that the desired encapsulation of the preformed particles has indeed occurred.

Particle size distribution is conveniently and reliably measured by use of a disk centrifuge such as that described by J. D. Hildreth and D. Patterson in J. Doc. Dyers Color., 80, 474 (1960).

A procedure for following the course of sequential emulsion polymerisation and the swelling of particles has been described by Cooper A. A., Devon MS and Rudin A. in Journal of Coatings Technology, vol. 61, No. 769 pp 239-244, 1989.

The core polymer may be made by aqueous emulsion polymerization of one or more ethylenically unsaturated monomers containing a carbon-carbon double bond and a carboxylic acid group. It is preferred, but not essential, that the carbon-carbon double bond in such monomers contains a carbon atom that carries two hydrogens. Such monomers are generally more reactive in polymerizations than the corresponding acidic monomers in which both carbons of the double bond are bonded to substituents other than hydrogen. Suitable acidic monomers include acrylic acid, methacrylic acid, itaconic acid, aconitic acid, maleic acid or anhydride, fumaric acid, crotonic acid, monoesters of the dibasic acids mentioned above and the like. Methacrylic acid is the preferred acidic component in this invention. The core polymer may be produced by the polymerization of one or more such acidic monomers. In preferred embodiments, however, an acidic monomer or mixture thereof is copolymerized with one or more ethylenically unsaturated monomers that contain no ionizable groups. Examples of such ethylenically unsaturated monomers include methyl methacrylate, styrene, vinyl toluene, alpha-methylstyrene, ethylene, vinyl acetate, vinyl chloride, acrylonitrile, (meth)acrylamide, various alkyl or alkenyl esters of methacrylic or acrylic acid, various alkyl esters of vinyl alcohol and the like. In general core polymers containing at least 10 per cent and preferably at least 20%, by weight of acid-containing monomers are particularly useful in the present invention.

In an optional, but preferred process for making the core/shell polymers of this invention the first stage in the emulsion polymerization sequence is the production of a so-called seed latex, which provides nuclei for the subsequent growth of the core polymer particles. The polymer of the seed latex may contain an acidic vinyl monomer, but this is not essential for the purposes of this invention. The particle size of the seed latex is preferably less than 100 nanometers.

The acid-containing core polymer particle, whether produced in a single stage or a multiplicity of stages, usually has a particle size of from 100 to 1000 nanometers and preferably between from 100 to 500 nanometers. Such measurements refer to the sizes of the latex particles in the unswollen condition.

As stated in the process of the invention the core particles are then formed into an aqueous dispersion containing the monomers to form the first shell. The shell is formed from a nonionic monoethylenically unsaturated aromatic monomer and a copolymerisable monomer which has a solubility in water at 20° C. of at least 1 per cent by weight. Also the copolymerisable monomer should be present in an amount of at least 15% by weight of the total weight of the monomer mixture. Preferably the monomers are free of free-acid groups so that the shell has no acid groups after formation.

Examples of these nonionic monoethylenically substituted monomers in which a phenyl or other aromatic group is attached to one of the carbon atoms of the carbon-carbon double bond are styrene, alpha-methylstyrene, vinyl toluene, ring substituted derivatives styrene, of alpha-methylstyrene and of vinyl toluene and mixtures thereof.

The copolymerisable monomer is chosen from those having a solubility in water of at least 1 per cent and examples of such are methyl methacrylate, acrylonitrile and methacrylamide. Methyl methacrylate is preferred. The amount of the said copolymerisable monomer is at least 15 per cent by weight and usually from 25% to 80% of the total weight of the total monomer mixture. The amount of the styrenic-type monomers i.e. the nonionic monoethylenically substituted monomers is usually greater than 20 per cent by weight of the total monomer mixture and preferably from 40% to 85% by weight.

The monomer mixture can also contain a so-called "soft" monomer or monomers together with the so-called "hard" monomers i.e. the styrene-type to lower the softening temperature of the first shell and thereby facilitate subsequent swelling.

Specific examples of soft monomers include butyl acrylate, ethyl acrylate, isobutyl acrylate, the various ethyl hexyl acrylates, butadiene, isoprene, lauryl methacrylate and similar long chain esters of acrylic and methacrylic acids and combinations thereof. Dibutyl maleate may also be used. Butyl acrylate is preferred.

Amounts of such soft monomers can vary according to the particular desired softening temperature but usually the amount will be at least 2% by weight of the weight of the monomer mixture.

A useful measure of the softening temperature of the sheath polymer is its glass-to-rubber transition temperature, which is denoted here as Tg. Tg may be measured by a variety of methods that are well known in the industry. Such methods are summarised in textbooks of polymer science such as "Elements of Polymer Science and Engineering", by Alfred Rudin, published by Academic Press in 1982. The Tg of a copolymer may be approximated by the equation:

$$\frac{1}{Tg} = \frac{W_a}{Tg_a} + \frac{W_b}{Tg_b}$$

where Tg is the glass-to-rubber transition temperature of the copolymer and $Tg_a$ and $Tg_b$ are the Tg values for homopolymers of monomer a and monomer b, which are present in the comonomer mixture with weight fractions of $W_a$ and $W_b$, respectively. The Tg of the sheath polymer used in this invention should be above room temperature and preferably be within the range 60° C. and 100° C.

The polymerization reactions involved in the present invention are initiated with initiating agents that are generally similar to those employed in conventional emulsion polymerizations. As is common to such processes, preferably water-soluble initiators are used. Examples are tert-butyl hydroperoxide, hydrogen peroxide, an alkali metal (sodium, potassium or lithium) or ammonium persulphate or a mixture of such initiator with a reducing agent to form a redox system. Examples of reducing agents include alkali metal or ammonium metabisulphites, hydrosulphites or hyposulphites, or sodium formaldehyde sulphoxylate or various metal ions, such as iron, chromium, copper and the like, that may exist in plurality of valence states. The concentration of initiator may be from 0.01 to about 2 per cent by weight of the monomers used in the polymerization and an approximately similar range of reducing agent may be used, in a redox system.

The molecular weight distribution of the polymer formed in any of the polymerization steps may be controlled through use of a free radical chain transfer agent, such as a mercaptan, mercaptoethanol ethanolamine, carbon tetrachloride, carbon tetrabromide or isooctyl mercaptopropionate.

Nonionic or anionic emulsifiers may be used, either alone or together. In the final latex, it is preferable that there should be present both an anionic surfactant and a non-ionic surfactant, for best polymerization of the monomer(s). The choice of mixed surfactants, along with the proper selection of initiator and polymerization temperature, facilitates the production of a stable latex and substantially complete absence of residual monomers, the presence of which would make the latex product obnoxious. Suitable anionic surfactants include sodium dodecyl benzene sulphonate and the like. Suitable non-ionic surfactants include ethoxylated alkyl phenols, where the alkyl group is nonyl, octyl, decyl, or similar substances that are known in the industry.

After the formation of the first shell there is polymerised onto the core/shell particles a second shell. It is preferred that this occurs immediately on completion of polymerisation of the first shell.

The second or outer shell is formed by forming an aqueous dispersion of the core/shell particles having the first shell and a monomer having a solubility of less than 1% by weight in water at 20° C. These monomers usually will be chosen from the said nonionic monoethylenically aromatic substituted monomers described hereinbefore which are used to form the first shell. Preferably the monomer is styrene or a styrenic type and the monomer or monomer mixture is free of acid groups.

Also there can be polymerised with the styrene or styrenic type monomer an amount of a so-called "soft" monomer chosen from those hereinbefore described and in an amount of, preferably, at least 2% by weight of the monomer mixture. The monomer mixture used to form the second shell will preferably be free of monomers which have been described herein as those having a solubility of at least 1% weight in water at 20° C.

Usually the monomers to form the second shell are added to the aqueous dispersion consecutively to those forming the first shell and preferably there is no time interval between the first and second additions, or at most, only a very short time interval.

After polymerisation of the second shell unswollen core/shell particles are obtained having a size of say 150 to 4000 nanometers and preferably between 200 and 2000 nanometers.

The unswollen core/shell particles are then heated to swell the particles to introduce one or more voids or vesicles in the particle.

The swelling of the core/shell particles is effected through the use of non-volatile fixed or permanent bases. Typically the swelling is effected at an elevated temperature e.g. of from 50° C. to 120° C. more preferably from 85° C. to 100° C. using an inorganic base such as an alkali metal hydroxide, bicarbonate or other similar base. Sodium hydroxide and potassium hydroxide are eminently suitable for use as the base. If desired, the swelling can be effected under superatmospheric pressure. Optionally an additional hard shell can be polymerized on said particles after the swelling step.

The swollen core/shell particles contain voids which when the particles are in the form of an aqueous dispersion are filled with liquid water. On drying the voids should become filled with air thus conferring on the particles their opacifying properties.

The particles can be used in a wide variety of applications such as aqueous paint systems, plastic compositions and many others where opacity is an important consideration.

The invention is illustrated in the following Examples.

EXAMPLE 1 (COMPARATIVE)

(a) Emulsion Polymerization of Seed Polymer

| water | 1018.0 g |
|---|---|
| anionic surfactant (Alcolac Inc. DS-10) | 6.05 g |
| ammonium persulphate initiator | 3.35 g |
| t-butyl hydroperoxide | 0.31 g |
| sodium formaldehyde sulphoxylate | 0.21 g |
| monomer emulsion: | |
| water | 298.5 g |
| butyl acrylate | 466.4 g |
| methyl methacrylate | 386.4 g |
| methacrylic acid | 44.9 g |
| anionic surfactant (Alcolac Inc. DS-10) | 0.6 g |

In a 5 liter stainless steel reactor, water and initiator were combined with stirring at 85° C. Monomer emulsion was added at 5 g/min. 35 minutes after monomer addition was complete the emulsion of seed polymer particles was cooled to 40° C. and filtered through a 200 mesh screen.

(b) Emulsion Polymerization of Core Polymer

| water | 43.6 g |
|---|---|
| ammonium persulphate initiator | 1.3 g |
| seed polymer emulsion | 22.0 g |
| monomer emulsion: | |
| water | 72.5 g |
| methyl methacrylate | 96.6 g |
| methacrylic acid | 35.17 g |
| butyl acrylate | 43.5 g |
| anionic surfactant (Siponate DS-10) | 0.3 g |

In a one liter reactor, water, initiator and seed polymer were combined with stirring at 85° C. Monomer emulsion was added at 1.2 g/min. 30 minutes after monomer addition was complete 0.2 g ammonium persulphate was added to the reactor. The reactor temperature was maintained at 85° C. The emulsion of core polymer particles was cooled to 35° C. and filtered through a 200 mesh screen. Number average particle size was determined to be 170 nm.

(c) Emulsion Polymerization of Core/Shell Polymer

| water | 180.0 g |
|---|---|
| ammonium persulphate initiator | 1.4 g |
| core polymer emulsion | 104.0 g |
| monomer emulsion: | |
| water | 70.0 g |
| methylmethacrylate | 100.0 g |
| styrene | 142.0 g |
| butylacrylate | 13.0 g |
| anionic surfactant (Siponate DS-10) | 0.8 g |
| nonionic surfactant (Alkasurf NP 40) | 2.4 g |

In a one liter glass reactor, water, initiator and core polymer were combined with stirring at 84° C. The monomer emulsion was added at 0.85 g/min. One hour after monomer addition was complete, the emulsion of core/shell particles was cooled to 35° C. and filtered through a 200 mesh screen.

(d) Sodium Hydroxide Treatment of Core/Shell Particles

| water | 13.0 ml |
|---|---|
| core/shell emulsion | 180.0 g |
| anionic soap (Dowfax 2A1) | 0.9 g |
| 10% aqueous sodium hydroxide | 13.0 g |

To the anionic soap and core/shell emulsion the aqueous sodium hydroxide was added over a 1 hour period at 88° C., then cooled to 35° C. Number average particle size of NaOH treated particles was 469 nm.

EXAMPLE 2 (COMPARATIVE)

(a) Emulsion Polymerization of Seed Polymer

| water | 1018.0 g |
|---|---|
| anionic surfactant (Alcolac Inc. DS-10) | 6.05 g |
| ammonium persulphate initiator | 3.35 g |
| t-butyl hydroperoxide | 0.31 g |
| sodium formaldehyde sulphoxylate | 0.21 g |
| monomer emulsion: | |
| water | 298.5 g |
| butyl acrylate | 466.4 g |
| methyl methacrylate | 386.4 g |
| methacrylic acid | 44.9 g |
| anionic surfactant (Alcolac Inc. DS-10) | 0.6 g |

In a 5 liter stainless steel reactor, water and initiator were combined with stirring at 85° C. Monomer emulsion was added at 5 g/min.; 35 min. after monomer addition was complete the emulsion of seed polymer particles was cooled to 40° C. and filtered through a 200 mesh screen.

(b) Emulsion Polymerization of Core Polymer

| water | 2582.0 g |
|---|---|
| ammonium persulphate initiator | 7.7 g |
| seed polymer emulsion | 131.4 g |
| monomer emulsion: | |
| water | 429.3 g |
| methyl methacrylate | 572.0 g |
| methacrylic acid | 450.0 g |
| butyl acrylate | 257.6 g |
| anionic surfactant (Siponate DS-10) | 1.78 g |

In a 5 liter stainless steel reactor, water, initiator and seed polymer were combined with stirring at 83° C. Monomer emulsion was added at 5 g/min. 30 minutes after monomer addition was complete 0.6 g t-butyl hydroperoxide and 0.41 g sodium formaldehyde sulphoxylate was added to the reactor. The reactor temperature was maintained at 83° C. The emulsion of core polymer particles was cooled to 40° C. and filtered through a 200 mesh screen. Number average particle size was determined to be 160 nm.

(c) Emulsion Polymerization of Core/Shell Polymer

| water | 1225.0 g |
|---|---|
| ammonium persulphate initiator | 2.1 g |
| core polymer emulsion | 828.0 g |
| monomer emulsion | |
| water | 500.0 g |
| methyl methacrylate | 1032.0 g |
| styrene | 591.0 g |
| butyl acrylate | 159.0 g |
| anionic surfactant (Dowfax 2A1) | 11.3 g |
| nonionic surfactant (Alkasurf NP40) | 15.5 g |

In a 5 liter stainless steel reactor, initiator and core polymer were combined with stirring at 85° C. Monomer emulsion was added at 5 g/min. 30 minutes after monomer addition was completed 0.7 g t-butyl hydroperoxide and 0.4 g sodium formaldehyde sulphoxylate was added to the reaction. The reactants were stirred for an additional 30 minutes. The emulsion of core/shell particles was cooled to 40° C. and filtered through 200 mesh screen. Number average particle size was determined to be 337 nm.

(d) Sodium Hydroxide Treatment of Core/Shell Particles (single layer shell)

| water | 105.0 g |
|---|---|
| core/shell emulsion | 3800.0 g |
| anionic soap (Dowfax 2A1) | 63.0 g |
| 10% aqueous sodium hydroxide | 300.0 g |

To the anionic soap and core/shell emulsion the aqueous sodium hydroxide was added over a 1 hour period at 91° C., then cooled to 40° C. Number average particle size of NaOH treated particles was 447 nm.

EXAMPLE 3 (INVENTION)

(a) Emulsion Polymerization of Seed Polymer

| water | 478.0 g |
|---|---|
| anionic surfactant (Alcolac Inc. DS-10) | 2.8 g |
| ammonium persulphate initiator | 1.6 g |
| t-butyl hydroperoxide | 0.15 g |
| sodium formaldehyde sulphoxylate | 0.1 g |
| monomer emulsion: | |
| water | 140.1 g |
| butyl acrylate | 219.2 g |
| methyl methacrylate | 197.0 g |
| methacrylic acid | 5.6 g |
| anionic surfactant (Alcolac Inc. DS-10) | 0.2 g |

In a one liter glass reactor, water and initiator were combined with stirring at 85° C. Monomer emulsion was added at 1.2 g/min. 30 minutes after monomer addition was complete the emulsion of seed polymer particles was cooled to 40° C. and filtered through a 200 mesh screen.

(b) Emulsion Polymerization of Core Polymer

| water | 2402.0 g |
|---|---|
| ammonium persulphate initiator | 5.6 g |
| seed polymer emulsion | 138.9 g |
| monomer emulsion: | |
| water | 405.0 g |
| methyl methacrylate | 639.5 g |
| methacrylic acid | 422.3 g |
| butyl acrylate | 144.5 g |
| anionic surfactant (Siponate DS-10) | 3.2 g |

In a 5 liter stainless steel reactor, water, initiator and seed polymer were combined with stirring at 85° C. Monomer emulsion was added at 5 g/min. 30 minutes after monomer addition was complete 1.1 g ammonium persulphate were added to the reactor. The reactor temperature was maintained at 85° C. The emulsion of core polymer particles was cooled to 40° C. and filtered through a 200 mesh screen.

(c) Emulsion Polymerization of Core/Shell Polymer

| water | 1714.0 g |
|---|---|
| ammonium persulphate initiator | 2.3 g |
| core polymer emulsion | 549.8 g |
| monomer emulsion (1st shell layer): | |
| water | 287.3 g |
| methyl methacrylate | 412.5 g |
| styrene | 675.0 g |
| butyl acrylate | 59.3 g |
| anionic surfactant (Siponate DS-10) | 3.8 g |
| nonionic surfactant (Alkasurf NP-40) | 15.0 g |
| monomer emulsion (2nd shell layer): | |
| water | 255.0 g |
| styrene | 480.0 g |
| butylacrylate | 24.0 |
| anionic surfactant (Siponate DS-10) | 2.3 g |
| nonionic surfactant (Alkasurf NP-40) | 9.0 g |

In a 5 liter stainless steel reactor, water, initiator and core polymer were combined with stirring at 85° C. First and second shell monomer emulsions were added consecutively at 5 g/min. One hour after monomer addition was complete, the emulsion of core/shell particles was cooled to 40° C. and filtered through a 200 mesh screen.

(d) Sodium Hydroxide Treatment of Core/Shell Particles (double layer shell)

| core/shell emulsion | 150.0 g |
|---|---|
| 10% aqueous sodium hydroxide | 9.4 g |

| | |
|---|---|
| Dowfax 2A1 | 0.2 g |

To the core/shell emulsion the sodium hydroxide solution was added and soaked at room temperature for 22 h. The Dowfax 2A1 was added. The mixture was heated to 90° C. and maintained at 89°-90° C. for 30 minutes. It was then cooled to room temperature and was filtered using a 200 mesh screen. Number average size of swollen particles was 495 nm.

EXAMPLE 4 (INVENTION)

(a) Emulsion Polymerization of Core Polymer

| | |
|---|---|
| water | 450.0 g |
| ammonium persulphate initiator | 1.3 g |
| anionic surfactant (Siponate DS-10) | 0.1 g |
| monomer emulsion: | |
| water | 70.0 g |
| methyl methacrylate | 120.0 g |
| methacrylic acid | 80.0 g |
| butyl acrylate | 28.0 g |
| anionic surfactant (Siponate DS-10) | 0.3 g |
| carbon tetrabromide | 0.15 g |

In a one liter reactor, water and initiator were combined with stirring at 83° C. Monomer emulsion was added at 1.2 g/min. 30 minutes after monomer addition was complete 0.2 g ammonium persulphate was added to the reactor. The reactor temperature was maintained at 83° C. The emulsion of core polymer particles was cooled to 35° C. and filtered through a 200 mesh screen. Number average particle size was determined to be 170 nm.

(b) Emulsion Polymerization of Core/Shell Polymer

| | |
|---|---|
| water | 130.0 g |
| ammonium persulphate initiator | 1.1 g |
| core polymer emulsion | 70.0 g |
| monomer emulsion (1st shell layer): | |
| water | 32.0 g |
| methyl methacrylate | 50.0 g |
| styrene | 70.0 g |
| butyl acrylate | 8.1 g |
| anionic surfactant (Siponate DS-10) | 0.4 g |
| nonionic surfactant (Alkasurf NP-40) | 1.9 g |
| monomer emulsion (2nd shell layer): | |
| water | 30.0 g |
| styrene | 80.5 g |
| butyl acrylate | 4.5 g |
| anionic surfactant (Siponate DS-10) | 0.25 g |
| nonionic surfactant (Alkasurf NP-40) | 1.2 g |

In a one liter reactor, water, initiator and core polymer were combined with stirring at 83° C. First and second shell monomer emulsions were added consecutively at 0.85 g/min. One hour after monomer addition was complete, the emulsion of core/shell particles was cooled to 35° C. and filtered through a 200 mesh screen.

(c) Sodium Hydroxide Treatment of Core/Shell Particles (double layer shell)

| | |
|---|---|
| water | 18.0 g |
| core/shell emulsion | 150.0 g |
| 10% aqueous sodium hydroxide | 11.0 ml |

To the core/shell emulsion the aqueous sodium hydroxide was added dropwise over a 1 hour period at 90° C., then cooled to 40° C. and filtered through a 200 mesh screen.

When examined by transmission electron microscopy the swollen particles of Examples 3 and 4, with compressed double shells as taught by this invention, were seen to have voids that were better centered than the single shell materials of Examples 1 and 2. Examples 3 and 4 contained significantly fewer non-spherical and ruptured particles and the particles contributed to the opacity of paint films when substituted for part of the titanium dioxide content of semi-gloss coatings formulations based on acrylic or vinyl-acrylic latex polymers.

Similar results were observed when swollen particles with double shells were produced by variations of the foregoing procedures of the invention, as illustrated by Examples 5-7.

EXAMPLE 5

(a) Emulsion Polymerization of Core/Shell polymer particles (double shell)

| | |
|---|---|
| water | 130.0 g |
| ammonium persulphate initiator | 1.1 g |
| core polymer emulsion from Example 4 | 70.0 g |
| monomer emulsion (1st shell layer): | |
| water | 32.0 g |
| methyl methacrylate | 50.0 g |
| styrene | 70.0 g |
| butyl acrylate | 8.5 g |
| anionic surfactant (Siponate DS-10) | 0.4 g |
| nonionic surfactant (Alkasurf NP-40) | 1.9 g |
| monomer emulsion (2nd shell layer): | |
| water | 30.0 g |
| styrene | 80.5 g |
| butyl acrylate | 4.5 g |
| anionic surfactant (Siponate DS-10) | 0.25 g |
| nonionic surfactant (Alkasurf NP-40) | 1.25 g |

In a one liter reactor, water, initiator and core polymer were combined with stirring at 83° C. First and second shell monomer emulsions were added consecutively at 0.85 g/min. One hour after monomer addition was complete, the emulsion of core/shell particles was cooled to 35° C. and filtered through a 200 mesh screen. Number average particle size was determined to be 316 nm.

(b) Sodium Hydroxide Treatment of Core/Shell Particles (double layer shell)

| | |
|---|---|
| water | 11.5 ml |
| core/shell emulsion | 190.0 g |
| 10% aqueous sodium hydroxide | 14.25 ml |

To the core/shell emulsion the sodium hydroxide solution was added and soaked (22 hours) overnight at 40°-50° C., then, was heated and maintained at 90° C. for 1 hour. It was cooled to 40° C. and filtered using a 200 mesh screen.

EXAMPLE 6

(a) Emulsion Polymerization of Seed Polymer

| | |
|---|---|
| water | 478.2 g |
| anionic surfactant (Alcolac Inc. DS-10) | 2.8 g |
| ammonium persulphate initiator | 1.6 g |
| t-butyl hydroperoxide | 0.15 g |
| sodium formaldehyde sulphoxylate | 0.1 g |
| monomer emulsion: | |

-continued

| | |
|---|---|
| water | 140.1 g |
| butyl acrylate | 219.2 g |
| methyl methacrylate | 197.0 g |
| methacrylic acid | 5.6 g |
| anionic surfactant (Alcolac Inc. DS-10) | 0.2 g |

In a one liter glass reactor water and initiator were combined with stirring at 85° C. Monomer emulsion was added at 1.2 g/min. 60 minutes after monomer addition was complete the emulsion of seed polymer particles was cooled at 40° C. and filtered through a 200 mesh screen.

(b) Emulsion Polymerization of Core Polymer

| | |
|---|---|
| water | 420.0 g |
| ammonium persulphate initiator | 1.0 g |
| seed polymer emulsion: | 25.1 g |
| monomer emulsion: | |
| water | 73.2 g |
| methyl methacrylate | 115.6 g |
| methacrylic acid | 76.3 g |
| butyl acrylate | 21.1 g |
| anionic surfactant (Siponate DS-10) | 0.52 g |
| ethanol | 8.0 g |

In a one liter reactor, water, initiator and seed polymer were combined with stirring at 85° C. Monomer emulsion was added at 0.85 g/min. 30 minutes after monomer addition was complete 0.2 g ammonium persulphate was added to the reactor. The reactor temperature was maintained at 85° C. The emulsion of core polymer particles was cooled to 35° C. and filtered through a 200 mesh screen.

(c) Emulsion Polymerization of Core/Shell Polymer

| | |
|---|---|
| water | 286.0 g |
| ammonium persulphate initiator | 0.85 g |
| core polymer emulsion | 80.3 g |
| monomer emulsion (1st shell layer): | |
| water | 51.6 g |
| methyl methacrylate | 74.25 g |
| styrene | 121.5 g |
| butyl acrylate | 10.67 g |
| anionic surfactant (Siponate DS-10) | 0.68 g |
| nonionic surfactant (Alkasurf NP-40) | 2.7 g |
| monomer emulsion (2nd shell layer): | |
| water | 45.9 g |
| styrene | 86.4 g |
| butyl acrylate | 4.32 g |
| anionic surfactant (Siponate DS-10) | 0.41 g |
| nonionic surfactant (Alkasurf NP-40) | 1.62 g |

In a one liter reactor, water, initiator and core polymer were combined with stirring at 85° C. First and second shell monomer emulsions were added consecutively at 0.85 g/min. One hour after monomer addition was complete, the emulsion of core/shell particles was cooled to 35° C. and filtered through a 200 mesh screen.

EXAMPLE 7

(a) Emulsion Polymerization of Core Polymer

| | |
|---|---|
| water | 420.0 g |
| ammonium persulphate initiator | 1.0 g |
| seed polymer emulsion (from Example 6) | 25.1 g |
| monomer emulsion: | |
| water | 73.2 g |
| methyl methacrylate | 115.6 g |

-continued

| | |
|---|---|
| methacrylic acid | 76.3 g |
| butyl acrylate | 21.1 g |
| anionic surfactant (Siponate DS-10) | 0.52 g |
| carbon tetrabromide | 2.21 g |
| carbon tetrachloride | 1.1 |
| ethanol | 8.0 g |

In a one liter reactor, water initiator and seed polymer were combined with stirring at 85° C. Monomer emulsion was added at 1.2 g/min. 30 minutes after monomer addition was complete 0.2 g ammonium persulphate was added to the reactor. The reactor temperature was maintained at 85° C. The emulsion of core polymer particles was cooled to 35° C. and filtered through a 200 mesh screen.

(b) Emulsion Polymerization of Core/Shell Polymer

| | |
|---|---|
| water | 286.0 g |
| ammonium persulphate initiator | 0.85 g |
| core polymer emulsion | 80.3 g |
| monomer emulsion (1st shell layer): | |
| water | 51.6 g |
| methyl methacrylate | 74.25 g |
| styrene | 121.5 g |
| butyl acrylate | 10.67 g |
| anionic surfactant (Siponate DS-10) | 0.68 g |
| nonionic surfactant (Alkasurf NP-40) | 2.7 g |
| monomer emulsion (2nd shell layer): | |
| water | 45.9 g |
| styrene | 86.4 g |
| butyl acrylate | 4.32 g |
| anionic surfactant (Siponate DS-10) | 0.41 g |
| nonionic surfactant (Alkasurf NP-40) | 1.62 g |

In a one liter reactor, water, initiator and core polymer were combined with stirring at 85° C. First and second shell monomer emulsions were added consecutively at 0.9 g/min. One hour after monomer addition was complete, the emulsion of core/shell particles was cooled to 35° C. and filtered through a 200 mesh screen.

The products of Examples 6 and 7 were treated with alkali to effect swelling as described below.

| | |
|---|---|
| Core/Shell emulsion | 140.0 g |
| 10% aqueous sodium hydroxide | 9.21 g |

To the core/shell emulsion the sodium hydroxide solution was added and soaked at room temperature for 1.5 h. The mixture was heated to 90° C. and was maintained for 30 minutes at 90° C. It was then cooled to room temperature and filtered using a 200 mesh screen.

EXAMPLE 8 (INVENTION)

(a) Emulsion Polymerization of Seed Polymer

| | |
|---|---|
| water | 382.5 g |
| anionic surfactant (Siponate DS-10) | 2.89 g |
| ammonium persulphate initiator | 2.0 g |
| monomer emulsion: | |
| water | 112 g |
| butyl acrylate | 175.4 g |
| methyl methacrylate | 157.6 g |
| anionic surfactant (Siponate DS-10) | 0.2 g |

In a one liter glass reactor water and initiator were combined with stirring at 85° C. Monomer emulsion was added at 1.2 g/min. Thirty minutes after monomer addition was complete the emulsion of seed polymer particles was cooled to 40° C. and filtered through a 200 mesh screen.

(b) Emulsion Polymerization of Core Polymer

| water | 460 g |
| potassium persulphate initiator | 1 g |
| seed polymer emulsion | 16.21 g |
| monomer emulsion: | |
| water | 63 g |
| methyl methacrylate | 94.05 g |
| methacrylic acid | 66.4 g |
| butyl acrylate | 42.3 g |
| anionic surfactant (Siponate DS-10) | 0.504 g |
| iso-octyl-3-mercapto propionate | 3.0 g |

In a one liter glass reactor, water, initiator and seed polymer were combined with stirring at 85° C. Monomer emulsion was added at 0.8 g/min. After monomer addition was complete the reactor temperature was maintained at 85° C. for 60 minutes. The emulsion of core polymer particles was cooled to 40° C. and filtered through a 200 mesh screen.

(c) Emulsion Polymerization of Core/Shell Polymer

| water | 295 g |
| potassium persulphate initiator | 1.0 g |
| core polymer emulsion | 140 g |
| monomer emulsion (1st shell layer): | |
| water | 50 g |
| methyl methacrylate | 134 g |
| styrene | 82 g |
| butyl acrylate | 6.5 g |
| anionic surfactant (Siponate DS-10) | 1.71 g |
| monomer emulsion (2nd shell layer): | |
| water | 49 g |
| styrene | 96.5 g |
| butylacrylate | 3.7 g |
| anionic surfactant (Siponate DS-10) | 0.9 g |

In a one liter reactor, water, initiator and core polymer were combined with stirring at 85° C. First and second shell monomer emulsions were added consecutively at 0.85 g/min. One hour after monomer addition was complete, the emulsion of core/shell particles was cooled to 35° C. and filtered through a 200 mesh screen.

(d) Sodium Hydroxide Treatment of Core/Shell Particles (double layer shell)

| core/shell emulsion | 150 g |
| 11.26% aqueous potassium hydoxide | 15.34 g |

To the core/shell emulsion the potassium hydroxide solution was added at 80° C. over a 15 minute period. The mixture was heated to 90° C. and maintained at 89°-90° C. for 30 minutes. It was then cooled to room temperature and was filtered using a 200 mesh screen.

(e) Preparation of swollen particles with outer polymer layer

| core/shell emulsion | 280 g |
| 12.4% aqueous potassium hydroxide | 25.58 g |
| ammonium persulphate initiator | 0.18 g |
| monomer emulsion: | |
| water | 5 g |
| styrene | 15 g |
| anionic surfactant (Siponate DS-10) | 0.096 g |

To the core/shell emulsion in a one liter reactor potassium hydroxide solution was added at 80° C. over a 15 minute period. The mixture was heated to 90° C. and maintained at 89°-90° C. for 30 minutes. The temperature was then lowered to 75° C. and initiator was added. The monomer emulsion was added at 75°-73° C. over 55 minutes. It was held at reaction temperature for a further 30 minutes then cooled to room temperature and filtered using a 200 mesh screen.

(f) Preparation of swollen particles with crosslinked outer polymer layer

| core/shell emulsion | 220 g |
| 14% aqueous potassium hydroxide | 17.74 g |
| potassium persulphate initiator | 0.25 g |
| monomer emulsion | |
| water | 18 g |
| styrene | 12.1 g |
| divinyl benzene | 0.24 g |
| anionic surfactant (Siponate DS-10) | 0.036 g |

To the core/shell emulsion in a one liter reactor potassium hydroxide solution was added at 80° C. over a 15 minute period. The mixture was heated to 90° C. and maintained at 89°-90° C. for 30 minutes. The mixture was then cooled to 61° C. and initiator was added. The monomer emulsion was added over 55 minutes. The mixture was held at reaction temperature for a further 30 minutes then cooled to room temperature and filtered using a 200 mesh screen.

To determine inherent opacity of the swollen particle, it was mixed with a polyvinyl acetate-based latex in the proportion nine parts by mass of wet latex (55% solids) to one part by mass of wet swollen particle (37.5% solids). The blend was drawn onto an opacity chart with a 3 mil Bird applicator. When the film had dried, opacity was determined using a Hunterlab model D25-9 tristimulus colorimeter to compare the reflectance (Y-value) over the black and white halves of the chart. The ratio $Y_{black}/Y_{white}$ was the contrast ratio. It described the opacity of the film.

The swollen particles were tested in this way. The original swollen particle (d) produced an opacity of 15%. The swollen particle with an uncrosslinked polystyrene outer layer (e) produced an opacity of 17% while the swollen particle with a crosslinked polystyrene outer shell (f) produced a contrast ratio of 20%.

We claim:

1. A process for the manufacture of vesiculated core/shell particles comprising:

forming an aqueous emulsion of at least one ethylenically unsaturated monomer with acid functionality, polymerising said unsaturated monomer to form core particles of polymer forming an aqueous dispersion of said core particles and a monomer mixture of a nonionic monoethylenically unsaturated aromatic monomer and a copolymerisable polar monomer in an amount of at least 15 per cent by weight of the total weight of the monomer mixture and said copolymerisable polar monomer having a solubility in water at 20° C. of at least 1 per cent by weight polymerising said monomer mixture to form a first shell on said core particles adding to an aqueous dispersion of said core particles having a first shell a further nonionic monomer which has a solubility in water at 20° C. of less than 1 per cent by weight and polymerising said further monomer to form a second shell on the said particles, and mixing the core/shell particles so obtained with a non-volatile inorganic base to swell the cores and generate therein one or more vesicles.

2. A process according to claim 1 in which the amount of said copolymerisable polar monomer is from 25% to 80%.

3. A process according to claim 1 in which the said polar monomer is selected from the group consisting of methyl methacrylate, acrylonitrile and methacrylamide.

4. A process according to claim 1 in which said nonionic monomer employed to form said first shell or said second shell is selected from the group consisting of styrene, alpha-methylstyrene, vinyl toluene, ring substituted derivatives of styrene, of alphamethylstyrene, and of vinyl toluene and mixtures thereof.

5. A process according to claim 1 in which the amount of said nonionic monomer used to form the first shell is greater than 25 per cent by weight of the total monomer mixture employed to form the first shell.

6. A process according to claim 1 in which the monomer mixture used to form the second shell is free of said copolymerisable polar monomer.

7. A process according to claim 1 in which said mixture of monomers used to form said first shell, or said second shell or both contains a soft monomer selected from the group consisting of butyl acrylate, ethyl acrylate, isobutyl acrylate, ethyl hexyl acrylate, butadiene, isoprene, lauryl methacrylate, a long chain esters of acrylic acid, a long chain ester of methacrylic acid, dibutyl maleate and mixtures thereof.

8. A process according to claim 1 in which said core is formed by polymerising an acidic monomer selected from the group consisting of acrylic acid, methacrylic acid, itaconic acid, aconitic acid, maleic acid, maleic acid anhydride, fumaric acid and crotonic acid.

9. A process according to claim 1 in which the core is a copolymer of an unsaturated monomer selected from the group consisting of methyl methacrylate, styrene, vinyl toluene, alpha methyl styrene, ethylene, vinyl acetate, vinyl chloride, acrylonitrile, acrylamide, methacrylamide, alkyl esters of methacrylic acid and of acrylic acid and of vinyl alcohol, and alkenyl esters of methacrylic acid and of acrylic acid and of vinyl alcohol.

10. A process according to claim 1 in which the core contains at least 10 per cent by weight of said monomer containing acid functionality.

11. A process according to claim 1 in which the said base is an alkali metal hydroxide.

12. A process according to claim 1 in which the said base is an alkali metal bicarbonate.

13. A core/shell polymer particle comprising:

a core containing acid functionality of a polymer or copolymer of an ethylenically unsaturated monomer a first shell around said core formed of a copolymer of a nonionic monoethylenically unsaturated aromatic monomer and a polar monomer in an amount of at least 15 per cent by weight of said copolymer and said polar monomer having a solubility in water at 20° C. of at least 1 per cent by weight, and a second shell of a polymer or copolymer of a nonionic monomer having a solubility in water of less than 1 per cent by weight, and said core/shell particles having at least one vesicule formed by reaction with a non-volatile inorganic base.

* * * * *